US009377125B2

(12) United States Patent
Lee et al.

(10) Patent No.: US 9,377,125 B2
(45) Date of Patent: Jun. 28, 2016

(54) SHUT-OFF DEVICE FOR PIPE

(71) Applicant: The Hong Kong and China Gas Company Limited, North Point, Hong Kong (CN)

(72) Inventors: Wai Keung Carson Lee, Hong Kong (CN); Wai Yeung Cheung, Hong Kong (CN)

(73) Assignee: THE HONG KONG AND CHINA GAS COMPANY LIMITED, North Point, Hong Kong (CN)

(*) Notice: Subject to any disclaimer, the term of this patent is extended or adjusted under 35 U.S.C. 154(b) by 61 days.

(21) Appl. No.: 14/264,097

(22) Filed: Apr. 29, 2014

(65) Prior Publication Data
US 2014/0332096 A1    Nov. 13, 2014

(30) Foreign Application Priority Data

May 7, 2013    (HK) .................................. 13105469

(51) Int. Cl.
F16K 31/24    (2006.01)
F16K 1/20     (2006.01)
F16K 31/26    (2006.01)

(52) U.S. Cl.
CPC ............... *F16K 31/24* (2013.01); *F16K 1/2007* (2013.01); *F16K 1/2042* (2013.01); *F16K 31/265* (2013.01); *Y10T 137/7358* (2015.04); *Y10T 137/7439* (2015.04); *Y10T 137/7485* (2015.04)

(58) Field of Classification Search
CPC ....... F16K 31/24; F16K 31/26; F16K 31/265; F16K 31/28; Y10T 137/3099; Y10T 137/7439; Y10T 137/7358; Y10T 137/7485
USPC .................. 137/409, 434, 448, 202
See application file for complete search history.

(56) References Cited

U.S. PATENT DOCUMENTS 717,450 A  * 12/1902  Prowant ................... F16K 31/26
                                                    137/434
1,233,654 A * 7/1917  Dziatkiewicz .......... F16K 31/24
                                                    137/445

(Continued)

FOREIGN PATENT DOCUMENTS

CH    658 892 A5    12/1986
CN    2267374 Y     11/1997

(Continued)

OTHER PUBLICATIONS

UK Intellectual Property Office, International Search Report in GB Patent No. 1407195.5 (Jun. 2, 2014).

(Continued)

*Primary Examiner* — Kevin Murphy
*Assistant Examiner* — Ian Paquette
(74) *Attorney, Agent, or Firm* — Leydig, Voit & Mayer, Ltd.

(57) ABSTRACT

A shut-off device for a pipe in a pipeline for operation in response to ingress of water, has a valve for installation in a pipe of the pipeline. The valve has a valve member moving between an open position, when the valve is open, to permit passage of fluid through the pipe, and a closed position, when the valve is closed, to shut off a passage extending through the pipe. A buoyant member associated with the valve member moves the valve member to the closed position automatically in the presence of ingress water in the vicinity of the buoyant member.

17 Claims, 4 Drawing Sheets

(56) References Cited

U.S. PATENT DOCUMENTS

| | | | | |
|---|---|---|---|---|
| 2,404,795 | A | * | 7/1946 | Garretson ............ F16K 31/265 137/202 |
| 3,448,759 | A | * | 6/1969 | Peerman .................. E03B 7/07 137/357 |
| 4,192,341 | A | | 3/1980 | Hilmer |
| 4,503,881 | A | * | 3/1985 | Vecchio .................... E03F 7/04 137/425 |
| 5,031,655 | A | | 7/1991 | Hebaus |
| 5,320,136 | A | * | 6/1994 | Morris .................. F16K 15/021 137/516.29 |
| 2007/0151605 | A1 | * | 7/2007 | O'Hara ..................... F17D 5/02 137/409 |

FOREIGN PATENT DOCUMENTS

| | | |
|---|---|---|
| GB | 1 531 083 | 11/1978 |
| JP | 9-242919 A | 9/1997 |
| JP | 2011-163548 A | 8/2011 |

OTHER PUBLICATIONS

Search Report in Hong Kong Patent Application No. 13105469.6 dated Jul. 3, 2013.

* cited by examiner

SHUT-OFF DEVICE FOR PIPE

The present invention relates to a shut-off device for pipe for use in a pipeline for operation in response to ingress of water.

BACKGROUND OF THE INVENTION

Pipelines or pipe networks for transmission and supply of gaseous fuels, such as town gas or natural gas, are often built underground and are therefore vulnerable to ingress of water in the case of accidents (e.g. leakage caused by nearby underground work and in particular damage by impinging water jets from burst water mains) or unexpected circumstances (e.g. soil/earth movement, and cracking or faulty condition of pipe fittings). Underground water leaking into the system may find its way spreading very quickly over a long distance down the pipeline. Such water will take considerable time to clear, subsequent to rectification of the leak or faulty condition. To worsen the problems, water carrying soil or dirt, etc. may reach and foul or cause damage to gas equipment/apparatus at the customers' premises.

As present, measures safeguarding or catering for the ingress of water into underground pipelines are rare or complicate.

The invention seeks to eliminate or at least to mitigate such a problem by providing a new or otherwise improved shut-off device for pipe for use in a pipeline for operation in response to ingress of water.

SUMMARY OF THE INVENTION

According to the invention, there is provided a shut-off device for pipe for use in a pipeline for operation in response to ingress of water, comprising a valve for installation in a pipe of said pipeline. The valve comprises a valve member supported for movement between an open position when the valve is open to permit passage through said pipe and a closed position when the valve is closed to shut off passage through said pipe. Included is a buoyant member associated with the valve member for moving the valve member to the closed position automatically in the presence of ingress water in the vicinity of the buoyant member.

Preferably, the valve member is arranged, upon movement from the open position to the closed position, to move into the passage through said pipe.

More preferably, the valve member is arranged to stay clear of the passage through said pipe when it is in the open position.

It is preferred that the valve member is arranged to move along a non-linear path from the open position to the closed position.

It is preferred that the valve member has a planar body and is arranged, in the open position, to extend along the direction of the passage through said pipe and, in the closed position, to extend transverse to the direction of the passage through said pipe.

It is preferred that the valve member normally stays in the open position and is adapted to return automatically to the open position upon removal of said ingress water.

In a preferred embodiment, the shut-off device includes a connecting mechanism provided between the valve member and the buoyant member such that the valve member is directly movable by or with the buoyant member.

More preferably, the connecting mechanism has a configuration which enables the buoyant member to move the valve member from the open position to the closed position along a relatively longer path compared to the path of the movement of the buoyant member causing the movement of the valve member.

It is preferred that the connecting mechanism comprises a linkage having a first link pivotably inter-connecting the valve member and the buoyant member for simultaneous movement.

It is further preferred that the linkage includes a base and a second link pivotably connecting the buoyant member to the base, with the first link pivotably connecting the valve member to the buoyant member.

It is yet further preferred that the linkage includes a pair of said second links of equal length and extending in parallel with each other such that the buoyant member is pivotable about the base at a constant angular position relative to the base.

Preferably, the valve member is pivotably connected to the base for angular movement about the base between the open position and the closed position.

More preferably, the linkage includes a third link fixed with and supporting the valve member, by means of which third link the valve member is pivotably connected to the base and to the buoyant member via the first link.

It is preferred that the buoyant member is pivotable at a constant angular position, and the valve member has a sealing surface and is arranged to be pivoted by the buoyant member from the open position with the sealing surface extending perpendicular to the angular position to the closed position with the sealing surface extending parallel to the angular position.

In a preferred embodiment, the valve includes a valve seat from which the valve member disengages in the open position and with which the valve member engages in the closed position.

More preferably, the valve member and the valve seat have respective sealing parts for inter-engagement to close the valve, and at least one of the sealing parts is provided with a magnet or magnets for magnetic attraction with the other sealing part to hold the valve member in the closed position.

In a specific construction, the buoyant member comprises a plurality of buoys connected together by means of a bracket.

In a preferred embodiment, the shut-off device includes a housing in which the valve and the buoyant member are provided, the housing having opposite open ends which include pipe jointing means.

More preferably, the housing has a main chamber for acting as part of the passage through said pipe and includes a bottom chamber immediately underneath the main chamber, accommodating the buoyant member and for collecting ingress water, and the buoyant member is arranged to float on collected ingress water to rise outwardly of the bottom chamber and in turn move the valve member towards or to the closed position.

Further more preferably, the bottom chamber has a lower part which is openable for removal of ingress water collected in the bottom chamber.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
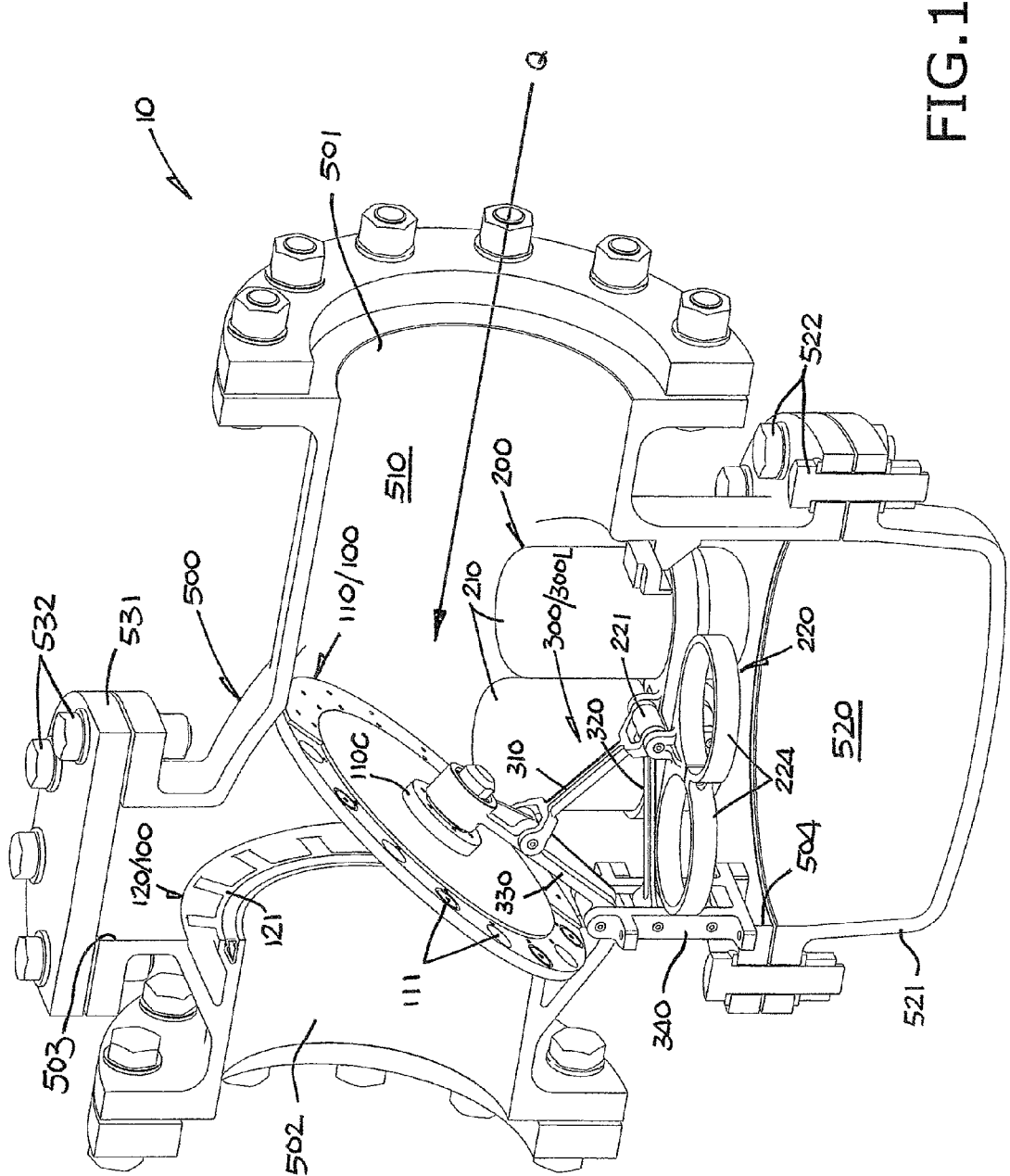
FIG. 1 is a perspective view of an embodiment of a shut-off device for pipe in accordance with the invention.

Referring to the drawings, there is shown a shut-off device 10 for pipe, embodying the invention, for use in a pipeline for operation in response to ingress of water into the pipeline. The pipeline is for the supply of gas fuel from the gas production plant and/or storage of a gas company to customers at a specific supply location or zone protected by the shut-off device 10. The shut-off device 10 includes a valve 100 installed in a pipe P of the pipeline and a buoyant member 200 for operating the valve 100. The pipe P has two adjoining sections P1 and P2, between which the shut-off device 10 is connected and at a lowermost position of the pipe P or preferably the entire pipeline.

Figure 4:
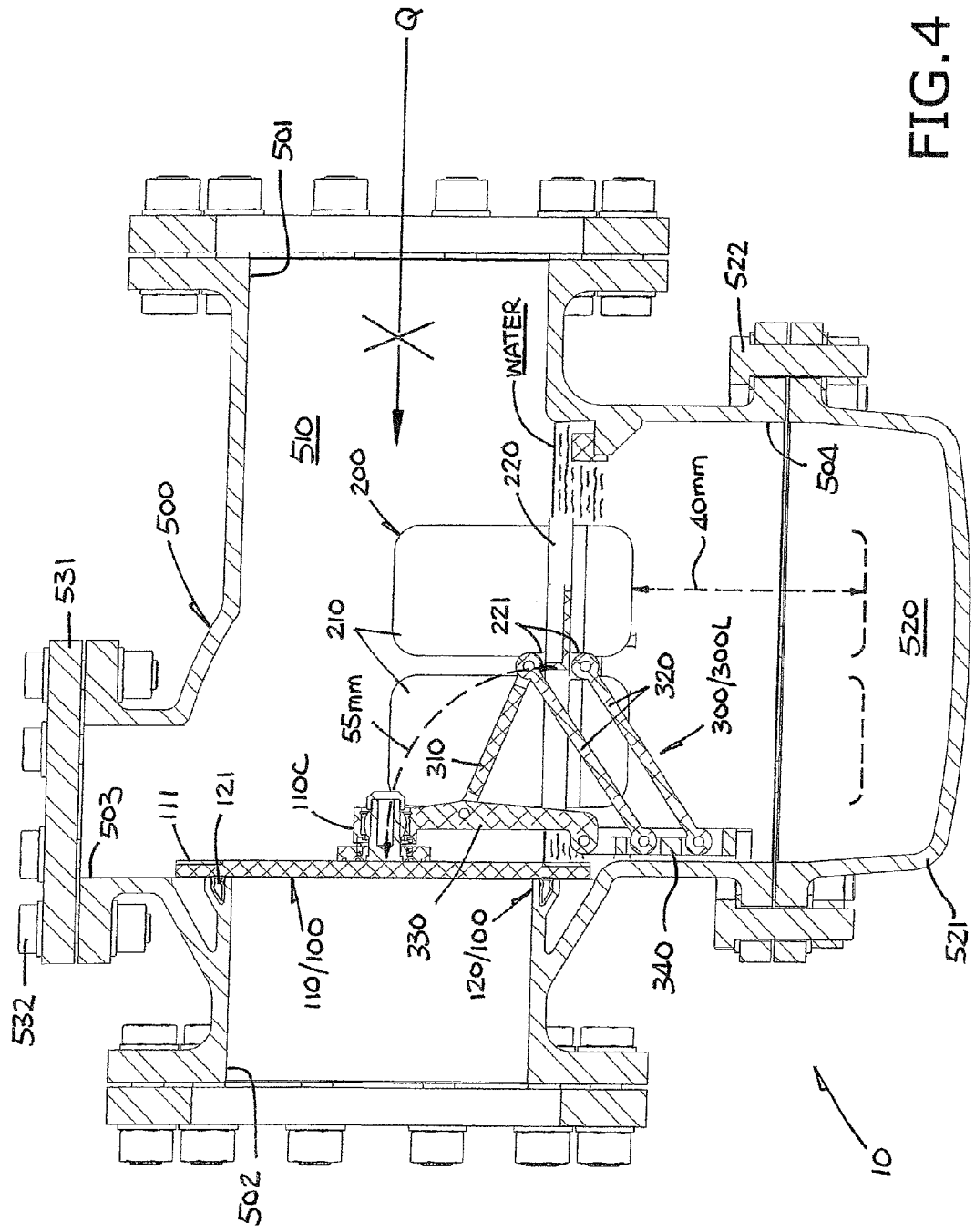
FIG. 4 is a cross-sectional side view corresponding to FIG. 3, showing the shut-off device then in a closed operating condition.

The valve 100 includes a valve member 110 supported for movement between a horizontal open position (FIG. 2) in which the valve 100 is open to permit passage Q through the pipe, and a vertical closed position (FIG. 4) in which the valve 100 is closed to shut off the passage Q. The buoyant member 200 is associated with the valve member 110 for moving the valve member 110 to the closed position automatically in the presence of ingress water in the vicinity of the buoyant member 200, when such water leaking into the pipe P builds up to sufficient quantity.

The buoyant member 200 may be associated with the valve member 110 in a number of ways for simultaneous movement, such as simply bearing against or abutting each other, being fixed relative to each other for movement as one rigid piece, or as in this particular embodiment being connected together by means of a connecting mechanism 300 for simultaneous movement in different directions. The use of the connecting mechanism 300 between the valve member 110 and the buoyant member 200 ensures that the valve member 110 is directly movable by, or with, the buoyant member 200.

In operation, the valve member 110 is arranged, upon movement from the open position to the closed position, to move into the passage Q for shutting off the pipe against flow of gas through the passage Q. While it is in the open position, the valve member 110 is arranged to stay clear of the passage Q, without obstructing the flow of gas through the passage Q.

The specific construction of the shut-off device 10 of this particular embodiment is now described in detail. It has a metallic housing 500 (e.g. made of cast iron) in which the valve 100 and the buoyant member 200 are installed. The housing 500 has opposite right and left cylindrical openings 501 and 502 which act as inlet and outlet respectively and include respective pipe jointing means in the form of integral flanges 501F and 502F, by means of which the shut-off device 10 is connected in the pipe P between the pipe sections P1 and P2. The housing 500 also includes upper and lower openings 503 and 504 which are likewise cylindrical.

Internally, the housing 500 defines a main chamber 510 which acts as part of the passage Q through the pipe P and in which the valve 100 is housed, and also a bottom chamber 520 immediately underneath the main chamber 510, in which the buoyant member 200 is accommodated. The main chamber 510 has a generally cylindrical shape and is in axial alignment with, and of the same cross-sectional size or footprint as, the inlet and outlet openings 501 and 502 on opposite sides thereof, together forming a right straight through passage Q. The bottom chamber 520 is situated immediately underneath the passage Q.

The valve 100 includes a valve seat 120 for co-operation with the valve member 110, from which the valve member 110 disengages in the open position and with which the valve member 110 engages in the closed position. The valve member 110 has a circular planar body. The valve seat 120 has an annular configuration and is provided by an inner end of the cylindrical outlet opening 502. The valve member 110 and the valve seat 120 have respective generally planar sealing parts or surfaces for inter-engagement, i.e. bearing against each other, to close the valve 100.

To enhance the sealing effect, a rubber seal ring 121 is embedded almost fully in the sealing surface of the valve seat 120. To further enhance the sealing effect, at least one of the sealing parts or the sealing part of the valve member 110 in this particular embodiment is provided with an annular series of magnets 111 (or a ring magnet). These magnets 111 are used to provide magnetic attraction with the other sealing part of the valve seat 120 for holding or maintaining the valve member 110 in the closed position, when the valve 100 is closed.

The bottom chamber 520 accommodates the buoyant member 200, and is arranged to collect water that leaks into the pipe P. The main chamber 510 is accessible from outside the housing 500 via the upper opening 503, which is normally sealed off by means of a round top lid 531 attached co-axially thereto by bolts 532. The bottom chamber 520 is provided by the cavity within the lower opening 504 as closed by a pot-like lower part or cover 521 underneath it. The cover 521 is secured co-axially to the lower opening 504 by bolts 522.

The bottom chamber 520 is at the lowermost position of the housing 500 as well as the pipe P or preferably the entire pipeline, such that water leaking into the pipeline will flow into the pipe P and be collected in the bottom chamber 520. The buoyant member 200 is arranged to float on ingress water collected in the bottom chamber 520 and hence rise outwardly of the bottom chamber 520 while simultaneously moving the valve member 110 towards and eventually to the closed position, whereby the valve 100 is closed. The cover 521 is openable and may be detached by undoing the bolts 522 for removal or draining of water collected in the bottom chamber 520, or for maintenance purposes.

The buoyant member 200 is provided by a set of four upright cylindrical buoys 210 that are connected together by means of a flat bracket 220. The bracket 220 is formed by four inter-connected horizontal rings 224 each surrounding a respective buoy 210, with a central hinge connection 221 amongst the rings 224. The buoys 210 may be hollow plastic or made of polystyrene material.

As to the connecting mechanism 300 provided between the valve member 110 and buoyant member 200, it is a linkage 300L which is formed by a first link 310, a pair of second links 320, a third link 330 and a base 340 supporting the overall linkage 300L. The base 340 is mounted vertically on the wall internally of the housing's bottom chamber 520 at a position right below the outlet opening 502. The first link 310 pivotably inter-connects, by its opposite ends, the valve member 110 and the buoyant member 200 together for simultaneous movement. An upper end of the first link 310 is pivotably connected to the valve member 110 via the third link 330, and a lower end thereof is connected to the central hinge connection 221 of the buoyant member 200.

The second links 320 pivotably connect the buoyant member 200 to the base 340, with the first link 310 pivotably connecting the valve member 110 to the buoyant member

200. The second links 320 are of equal length and extend in parallel with each other, together forming opposite sides of a parallelogram linkage, such that the buoyant member 200 is pivotable about the base 340 at a constant angular position relative to the base 340, as it moves upwards out of and downwards into the bottom chamber 520. In this arrangement, the buoyant member 200 will stay with its buoys 210 upright at all time, either during movement or at rest.

The valve member 110 is pivotably connected to the base 340, by means of the third link 330, for angular movement about the base 340 between the horizontal open position and the vertical closed position. Hence, in particular, the valve member 110 is arranged to move along a non-linear path from the open position to the closed position.

More specifically, the third link 330 has one end fixed with a central part 110C of the valve member 110 and the other end hinged to the uppermost end of the base 340.

While extending radially of, and parallel to, the circular planar body of the valve member 110, the third link 330 provides support for the valve member 110. By means of the third link 330, the valve member 110 is pivotably connected to the base 340 for pivotal movement between its open and closed positions and also to the buoyant member 200 via the first link 310 for operation (i.e. movement) by the buoyant member 200. The first link 310 is hinged to the third link 330 at a position along the third link 330 about one-third of its length from the valve member 110 and two-third of its length from the base 340.

Figure 2:
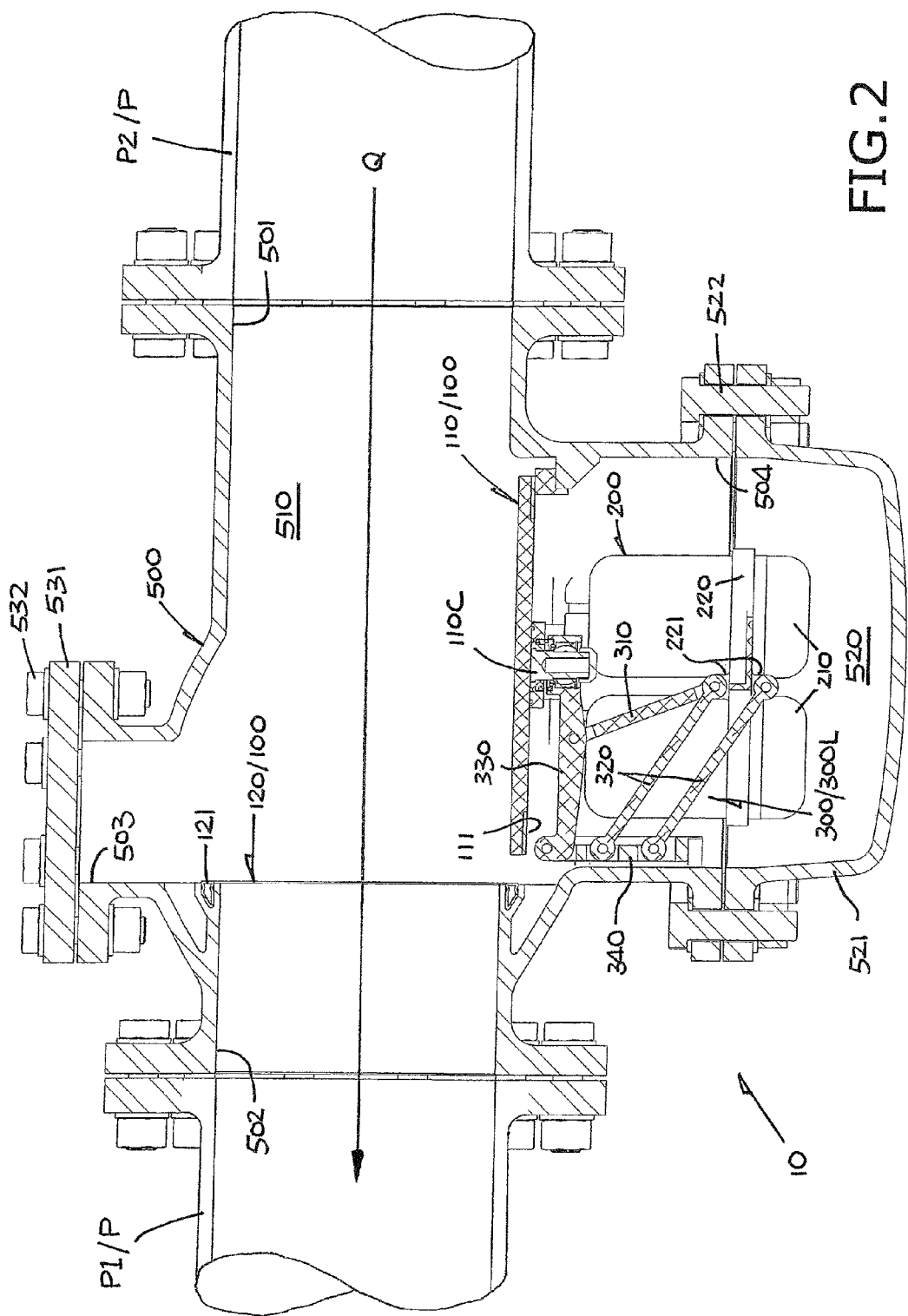
FIG. 2 is a cross-sectional side view of the shut-off device of FIG. 1, showing the shut-off device initially in an open operating condition.

In general, the base 340 acts as a mount for the valve member 110 and the buoyant member 200 as articulated together by the linkage 300L, by means of which linkage 300L the valve member 110 is positioned normally, when the valve 100 is open, horizontally flat across the mouth of the bottom chamber 520 in the housing 500 (FIG. 2). In the valve-open position, the valve member 110 stays completely clear of the passage Q through the pipe P, without obstructing the flow of gas through the passage Q, and hence the supply of gas can proceed as usual.

The valve member 110 is arranged, in the open position, to extend along or substantially parallel to the direction of the passage Q and, in the closed position, to extend transverse or substantially perpendicular to the direction of the passage Q.

As mentioned above, the buoyant member 200 is pivotable about the base 340 at a constant angular position (relative to the base 340), and the buoyant member 200 will stay with its buoys 210 upright at all time. The constant angular position is thus an upright position. It follows that the valve member 110 is to be pivoted by the buoyant member 200 from the horizontal open position with its sealing surface extending perpendicular to the said upright position to the vertical closed position with the sealing surface extending parallel to the said upright position.

In the case of accidental ingress of water, which may be caused by for example impinging water jets from burst underground water mains damaging a part of the pipeline nearby, water leaking or entering into the pipeline will eventually reach the shut-off device 10 and be collected in the bottom chamber 520.

Figure 3:
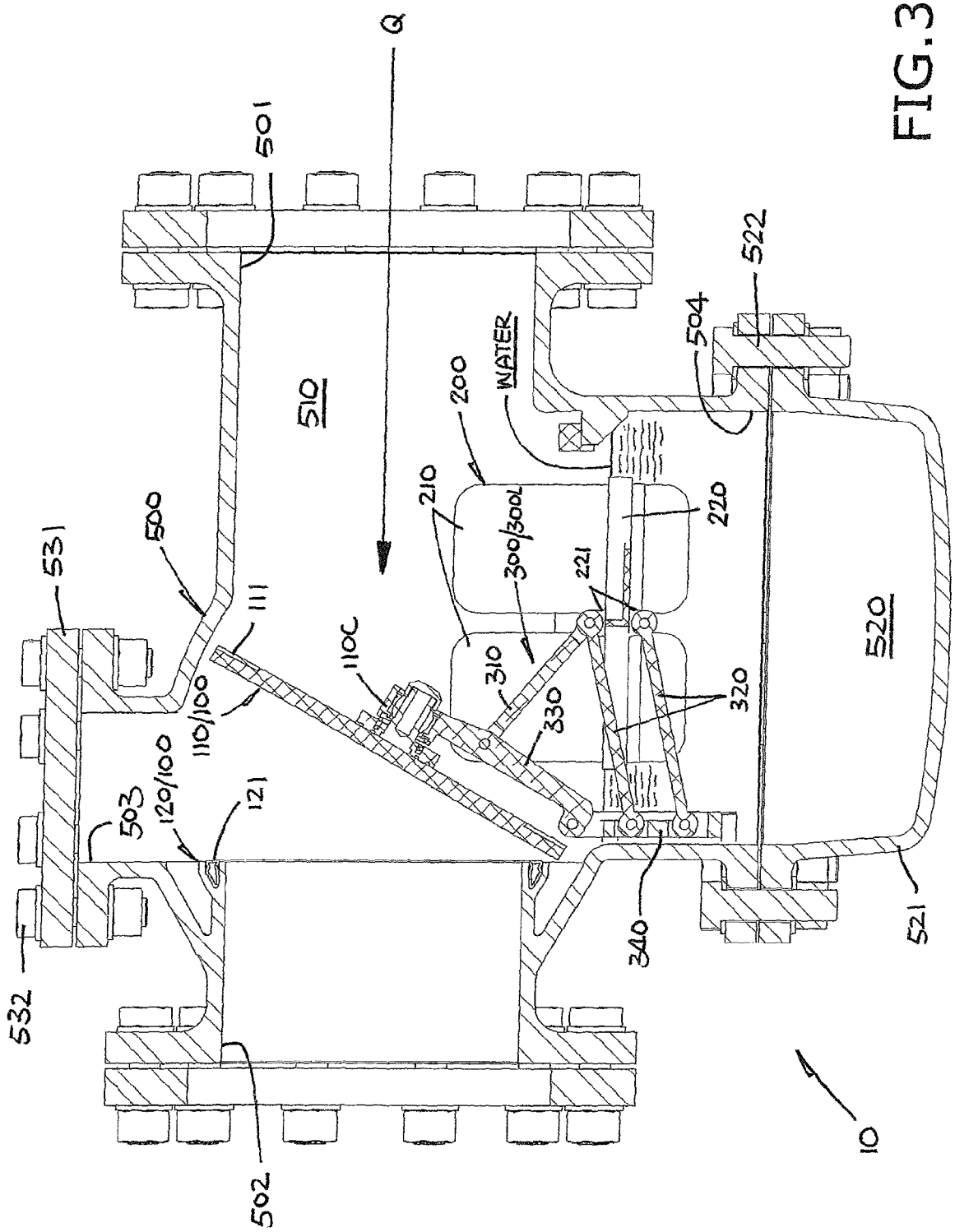
FIG. 3 is a cross-sectional side view corresponding to FIG. 2, showing the shut-off device subsequently in an intermediate operating condition.

As water builds up in the bottom chamber 520, the buoyant member 200 will eventually be reached and displaced by the rising water, thereby floating and rising with the water together. The buoyant member 200 rises to push and pivot the valve member 110 upwards, causing the latter to depart from the horizontal open position and swing up towards the vertical closed position (FIG. 3). Before the bottom chamber 520 is filled up, the valve member 110 will reach and bear tight against the valve seat 120, whereby the valve 100 is closed (FIG. 4) automatically to shut off the passage Q and in turn the supply of gas to the customers in the associated supply location or zone.

It is noted that the connecting mechanism 300 or linkage 300L has a configuration which enables the buoyant member 200 to move the valve member 110 from the open position to the closed position along a relatively longer path compared to the path of the movement of the buoyant member 200 causing the movement of the valve member 110. For example, as measured comparing FIG. 4 with FIG. 2, whilst the buoyant member 200 has risen over a vertical distance of about 40 mm, the valve member 110 has been pivoted thereby over an arcuate distance of about 55 mm (measured at its central part 110C).

The supply of gas via the passage Q is terminated. More importantly, the customers' side of the pipeline downstream of the tripped shut-off device 10 is sealed off by the closed valve 100 and hence protected against invasion by the water leaking into the pipeline on the gas supply side.

The shut-off device 10 should be reset in order to prepare for resuming of the supply of gas via the passage Q after the leakage has been rectified, for example a damaged pipe section and/or fitting (e.g. joint) of the pipeline having been repaired or replaced. To reset the shut-off device 10, the water collected inside should be drained and the valve 100 re-opened.

Detaching the bottom cover 521 by undoing the bolts 522 will open up the bottom chamber 520 and allow the water collected in the housing 500 and beyond to drain out or otherwise be removed or disposed of. Detaching the top lid 531 by undoing the bolts 532 will reveal the interior of the main chamber 510 and permit access to the valve member 110. It is then possible to release manually the valve member 110 from the valve seat 120, for example, by using a screwdriver to pry off the valve member 110 against the magnetic attraction force applied by the magnets 111. The valve member 110 will fall back down to the original open position under its own weight and the weight of the linkage 300L and the buoyant member 200. Detaching the top lid 531 may also permit the insertion of a dewatering tool, e.g. suction tube, to remove water from the bottom chamber 520, instead of detaching the bottom cover 521. With the cover 521 and/or the lid 531 re-attached, the shut-off device 10 is reset and subsequently the supply of gas via the passage Q can be resumed.

In operation, the valve member 110 is held tight against the valve seat 120 primarily by the force of floatation upon the buoyant member 200 as displaced by the water in the bottom chamber 520. The magnitude of this force may be adjusted or enhanced in a number of ways, e.g. by increasing cross-sectional size of the buoys 210 and/or Mechanical Advantage of the linkage 300L. This force will subsist for as long as water remains inside the shut-off device 10, i.e. prior to resetting of the same.

The magnets 111 are fitted to provide additional holding force for the valve member 110 in the closed position, as may be necessary, is optional though preferred. Without such or equivalent magnets, the valve member 110 may or is adapted to return automatically to the open position upon removal of ingress water from the shut-off device 10, in which case resetting of the shut-off device 10 may become simpler.

It is envisaged that the supply of gas may come in either one of the two opposite directions, e.g. in the direction opposite to the passage Q (i.e. opposite to direction Q), without affecting the operation of the shut-off device 10. In addition, the shut-off device 10 will still work even if the leakage is on the opposite side and ingress water comes in via the pipe section P1 (i.e. opposite to direction Q), as the water will flow past the valve 100 (which is open before tripping) and then be collected in the bottom chamber 520 and then close the valve 100.

A supply location/zone for key customers, e.g. shopping malls or restaurants, may be served by a ring-circuit pipeline for uninterrupted gas supply. In that case, gas may continue to be delivered to the customers from the remaining side of the shut-off device 10, which has been tripped to seal off the leaking side fouled by water.

The invention has been given by way of example only, and various other modifications of and/or alterations to the described embodiment may be made by persons skilled in the art without departing from the scope of the invention as specified in the appended claims.

For example, the valve may instead be a sliding valve including a valve member that slides vertically upwards by a buoyant member (which may be rigidly connected to the valve member from below) into the path of supply of gas in order to close the valve. To accommodate such a value, the bottom chamber may have to be made deeper. In addition, the sliding valve may incorporate a pair of valve members facing in opposite directions to cater specifically for water leaking on either side of the valve.

The invention claimed is:

1. A shut-off device comprising:
    a housing including
        first and second opposed openings for respectively admitting and discharging a gas flowing through a passage extending between the first and second openings,
        respective pipe joining means at the first and second openings for attaching the housing to pipes of a pipeline,
        a main chamber including the passage extending between the first and second openings, and
        a bottom chamber below and in communication with the main chamber;
    a valve disposed within the main chamber and comprising
        a valve member pivotally attached to the housing for movement between an open position permitting the flow of the gas through the passage extending between the first and second openings, and a closed position shutting off the flow of the gas through the passage extending between the first and second openings, and
        a valve seat within the main chamber, that is part of the housing, and against which the valve member bears, in the closed position, shutting off the flow of the gas through the passage extending between the first and second openings, wherein
            the valve member, in the open position, is received in the bottom chamber and is not located within the passage, and
            the valve member, in moving from the open position to the closed position, moves into the passage;
    a buoyant member floating in water and located in the bottom chamber when the valve member is in the open position and rising from the bottom chamber toward the main chamber in response to collection of water in the bottom chamber; and
    a linkage connecting the buoyant member to the housing and connecting the buoyant member to the valve member and moving the valve member toward the closed position upon the collection of water in the bottom chamber and rising of the buoyant member from the bottom chamber toward the main chamber on the water collected in the bottom chamber.

2. The shut-off device as claimed in claim 1, wherein the valve member moves along a non-linear path from the open position to the closed position.

3. The shut-off device as claimed in claim 1, wherein the valve member has a planar body and, in the open position, the planar body extends along the passage, and, in the closed position, the planar body extends transverse to the passage.

4. The shut-off device as claimed in claim 1, wherein the valve member normally stays in the open position and returns to the open position upon drainage of water from the bottom chamber and descent of the buoyant member into the bottom chamber.

5. The shut-off device as claimed in claim 1, wherein the linkage moves the valve member from the open position to the closed position along a relatively longer path than the path of rising of the buoyant member on the water collected in the bottom chamber.

6. The shut-off device as claimed in claim 1, wherein
    the buoyant member is pivotable at a constant angular position relative to the housing, and
    the valve member has a sealing surface that is pivoted by the buoyant member through the linkage from the open position, in which the sealing surface extends perpendicular to the constant angular position of the buoyant member, to the closed position, in which the sealing surfaced extends parallel to the constant angular position of the buoyant member.

7. The shut-off device as claimed in claim 1, wherein the buoyant member comprises a plurality of buoys connected together by a bracket.

8. The shut-off device as claimed in claim 1, wherein the bottom chamber has a lower part which is openable for removal of the water collected in the bottom chamber.

9. The shut-off device as claimed in claim 1, wherein
    the valve member and the valve seat have respective sealing parts for closing the valve, and
    at least a first of the sealing parts includes a ring magnet or a plurality of magnets in an annular array for magnetic attraction of a second of the sealing parts to hold the valve member in the closed position until released.

10. The shut-off device as claimed in claim 9, wherein the housing includes
    an upper opening located opposite the bottom chamber for providing access from outside the housing to the valve seat, for releasing the valve member, when the valve member is in the closed position, from the valve seat, and
    a top lid detachably mounted on the housing and closing the upper opening.

11. The shut-off device as claimed in claim 1, wherein the linkage comprises a first link pivotably inter-connecting the valve member and the buoyant member.

12. The shut-off device as claimed in claim 11, wherein
    the linkage includes a base mounted on the housing in the bottom chamber and a second link pivotally connecting the buoyant member to the base, and
    the first link pivotally connects the valve member to the buoyant member.

13. The shut-off device as claimed in claim 12, wherein
    the linkage includes a pair of the second links pivotally connected to the base at respective locations on the base,
    the second links have the same lengths, and
    the second links are parallel to each other such that the buoyant member is pivotable about the base at a constant angular position relative to the base.

14. The shut-off device as claimed in claim 12, wherein the valve member is pivotally connected to the base, for angular movement about the base, between the open position and the closed position.

15. The shut-off device as claimed in claim 14, wherein the linkage includes a third link supporting the valve member, and pivotally connecting the valve member to the buoyant member via the first link.

16. A shut-off device for a pipe in a pipeline, the shut-off device comprising:
- a valve for installation in the pipe of the pipeline, the valve comprising a valve member supported for movement between an open position, when the valve is open, to permit fluid flow through a passage of the pipe, and a closed position when the valve is closed, to shut off flow of the fluid through the passage of the pipe;
- a buoyant member associated with the valve member for moving the valve member to the closed position upon detection of ingress of water proximate the buoyant member;
- a connecting mechanism located between the valve member and the buoyant member such that the valve member is directly movable by or with the buoyant member, wherein
  - the connecting mechanism comprises a linkage having a first link pivotally inter-connecting the valve member and the buoyant member,
  - the linkage includes a base and a pair second links pivotally connecting the buoyant member to the base, the second links have the same length and extend parallel to each other so that the buoyant member is pivotable about the base at a constant angular position relative to the base, and
  - the first link pivotally connects the valve member to the buoyant member.

17. A shut-off device for a pipe in a pipeline, the shut-off device comprising:
- a valve for installation in the pipe of the pipeline, the valve comprising a valve member supported for movement between an open position, when the valve is open, to permit fluid flow through a passage of the pipe, and a closed position when the valve is closed, to shut off flow of the fluid through the passage of the pipe; and
- a buoyant member associated with the valve member for moving the valve member to the closed position upon detection of ingress of water proximate the buoyant member, wherein
  - the buoyant member is pivotable at a constant angular position, and
  - the valve member has a pivoting sealing surface that is pivoted by the buoyant member from the open position, with the sealing surface extending perpendicular to the angular position, to the closed position, with the sealing surface extending parallel to the angular position.

* * * * *